US011975328B2

(12) United States Patent
Drews et al.

(10) Patent No.: US 11,975,328 B2
(45) Date of Patent: May 7, 2024

(54) LIQUID SAMPLE LOADING

(71) Applicants: Illumina, Inc., San Diego, CA (US); Illumina Cambridge Limited, Cambridge (GB)

(72) Inventors: Bradley Kent Drews, Poway, CA (US); Gudrun Stengel, San Diego, CA (US); James Christopher Blake, La Jolla, CA (US); Mohammed Kafeel Ahamed, Carlsbad, CA (US); Michael Steven Becker, Del Mar, CA (US); Michael Dangelo, San Diego, CA (US); Mark J. Nibbe, San Diego, CA (US); Daniel L. Fuller, Cambridge (GB); Oliver Jon Miller, Cambridge (GB)

(73) Assignees: ILLUMINA, INC., San Diego, CA (US); ILLUMINA CAMBRIDGE LIMITED, Cambridge (GB)

( * ) Notice: Subject to any disclaimer, the term of this patent is extended or adjusted under 35 U.S.C. 154(b) by 16 days.

(21) Appl. No.: 17/507,254

(22) Filed: Oct. 21, 2021

(65) Prior Publication Data

US 2022/0040690 A1 Feb. 10, 2022

Related U.S. Application Data

(62) Division of application No. 16/127,882, filed on Sep. 11, 2018, now Pat. No. 11,179,724.

(Continued)

(51) Int. Cl.

*B01L 3/00* (2006.01)
*B01L 9/00* (2006.01)

(52) U.S. Cl.

CPC ..... *B01L 3/50853* (2013.01); *B01L 3/502715* (2013.01); *B01L 9/523* (2013.01);

(Continued)

(58) Field of Classification Search

None

See application file for complete search history.

(56) References Cited

U.S. PATENT DOCUMENTS 5,039,493 A 8/1991 Oprandy
6,054,100 A 4/2000 Stanchfield et al.

(Continued)

FOREIGN PATENT DOCUMENTS

CN 104136596 11/2014
JP 2004-205372 A 7/2004

(Continued)

OTHER PUBLICATIONS

Chinese Decision of Rejection dated Feb. 28, 2022 in related Chinese Patent Application No. 201811063615.3 (21 pages).

(Continued)

*Primary Examiner* — Brian R Gordon

(74) *Attorney, Agent, or Firm* — Rothwell, Figg, Ernst & Manbeck, P.C.

(57) ABSTRACT

The assembly includes a docking console and a manifold. The docking console includes a cartridge support surface having a first end and a second end. The manifold has one or more wells defined therein. The docking console further includes a manifold retention bracket to releasably hold the manifold against a fluid cartridge supported on the cartridge support surface at an interface position such that the one or more wells are in fluid communication with the fluid cartridge and a biased seal bar to press the fluid cartridge against the manifold held by the manifold retention bracket. A hydrophilic porous frit disposed within at least one of the wells and is to permit liquid to flow through the outlet aperture but prevent gas from passing through the outlet aperture.

6 Claims, 12 Drawing Sheets

Related U.S. Application Data

(60) Provisional application No. 62/564,466, filed on Sep. 28, 2017.

(52) U.S. Cl.
CPC ......... *B01L 9/527* (2013.01); *B01L 2200/025* (2013.01); *B01L 2200/027* (2013.01); *B01L 2200/0684* (2013.01); *B01L 2200/0689* (2013.01); *B01L 2300/041* (2013.01); *B01L 2300/047* (2013.01); *B01L 2300/048* (2013.01); *B01L 2300/0681* (2013.01); *B01L 2300/0819* (2013.01); *B01L 2300/0829* (2013.01)

(56) References Cited

U.S. PATENT DOCUMENTS

| | | | |
|---|---|---|---|
| 6,254,826 | B1 * | 7/2001 | Acosta ................. G01N 35/028 422/65 |
| 6,272,939 | B1 | 8/2001 | Frye et al. |
| 6,855,553 | B1 | 2/2005 | Bedingham et al. |
| 7,156,996 | B2 | 1/2007 | Watzele et al. |
| 7,767,154 | B2 | 8/2010 | Nichols et al. |
| 8,221,697 | B2 | 7/2012 | Nichols et al. |
| 10,532,324 | B1 | 1/2020 | Masquelier et al. |
| 2002/0045243 | A1 | 4/2002 | Laska et al. |
| 2003/0036086 | A1 | 2/2003 | Leonard et al. |
| 2003/0199899 | A1 | 10/2003 | Boecker et al. |
| 2003/0199910 | A1 | 10/2003 | Boecker et al. |
| 2003/0215940 | A1 | 11/2003 | Lacey et al. |
| 2003/0224505 | A1 | 12/2003 | Patno et al. |
| 2004/0137604 | A1 * | 7/2004 | Goodman ............... B01L 9/527 435/288.3 |
| 2005/0148091 | A1 | 7/2005 | Kitaguchi et al. |
| 2005/0201901 | A1 | 9/2005 | Grossman et al. |
| 2005/0277185 | A1 | 12/2005 | Levin et al. |
| 2008/0219890 | A1 | 9/2008 | Lawson et al. |
| 2009/0269767 | A1 | 10/2009 | Soderlund et al. |
| 2011/0207621 | A1 | 8/2011 | Montagu et al. |
| 2012/0164750 | A1 * | 6/2012 | Gjerde ................... G01N 1/405 436/178 |
| 2012/0257953 | A1 | 10/2012 | Williams et al. |
| 2012/0275955 | A1 * | 11/2012 | Haghgooie ...... A61B 5/150213 210/321.62 |
| 2013/0196276 | A1 | 8/2013 | Lee et al. |
| 2014/0080226 | A1 | 3/2014 | Cauley, III et al. |
| 2014/0363838 | A1 * | 12/2014 | McDevitt ........... G01N 33/5005 435/29 |
| 2015/0024436 | A1 * | 1/2015 | Eberhart .......... G01N 27/44734 204/601 |
| 2015/0346097 | A1 | 12/2015 | Battrell et al. |
| 2016/0114323 | A1 * | 4/2016 | Martineau ........... B01L 3/50273 506/40 |
| 2016/0243548 | A1 | 8/2016 | Bhagat et al. |
| 2016/0281150 | A1 | 9/2016 | Rawlings et al. |
| 2016/0339429 | A1 | 11/2016 | Mershin et al. |
| 2017/0157615 | A1 | 6/2017 | Carrano et al. |
| 2017/0274378 | A1 * | 9/2017 | Turner .............. B01L 3/502715 |
| 2018/0147574 | A1 | 5/2018 | Dysli et al. |
| 2018/0185849 | A1 | 7/2018 | Kaplan et al. |
| 2019/0091682 | A1 | 3/2019 | Drews et al. |
| 2020/0164365 | A1 | 5/2020 | King |

FOREIGN PATENT DOCUMENTS

| | | | |
|---|---|---|---|
| JP | 2005-270729 | A | 10/2005 |
| JP | 2011-522219 | A | 7/2011 |
| JP | 2011-214984 | A | 10/2011 |
| JP | 3192220 | U | 8/2014 |
| JP | 2017-502281 | A | 1/2017 |
| KR | 10-2011-0083460 | A | 7/2011 |
| TW | 517154 | | 1/2003 |
| WO | 2013/059750 | | 4/2013 |
| WO | 2016/077341 | | 5/2016 |
| WO | 2016/196210 | A2 | 12/2016 |
| WO | 2017094674 | A1 | 6/2017 |

OTHER PUBLICATIONS

Invitation to Pay Additional Fees dated Dec. 5, 2018 issued in International Application No. PCT/US2018/050410. (16 pages).

International Search Report and Written Opinion dated Feb. 4, 2019 issued in International Application No. PCT/US2018/050410. (22 pages).

* cited by examiner

LIQUID SAMPLE LOADING

CROSS REFERENCE TO RELATED APPLICATION

This application is a divisional of and claims the benefit under 35 U.S.C. §§ 120, 121 of the filing date of non-provisional patent application Ser. No. 16/127,882 filed Sep. 11, 2018, which claims the benefit under 35 U.S.C. § 119(e) of the filing date of provisional patent application Ser. No. 62/564,466 filed Sep. 28, 2017, the disclosure of which is incorporated herein by reference.

BACKGROUND

Various assay protocols for clinical and molecular processes are implemented in fluidic devices having channels that hold and direct fluid for mixing, processing, reaction, detection, etc. One example of such protocol is DNA sequencing, in which a fluid sample of library molecules are loaded into a fluidic device that is loaded into a processing instrument, e.g., a sequencer, where the library molecules are converted into clusters via an amplification technique, such as polymerase chain reaction, and then detected using electrochemical detection.

There is a general need for efficiently loading the fluid sample of library molecules into the fluidic device outside the processing instrument. However, due to the highly viscous nature of the fluid sample, in some instances it is difficult to aspirate and dispense the fluid sample into the fluid device outside the processing instrument, especially with manual pipette operations. In some instances, when loading a fluidic device via a manual pipette, air bubbles formed in the fluid sample can clog the channels of the fluidic devices, thereby preventing the fluid sample from passing through the channels of the fluidic devices via capillary force. Consequently, in those instances expensive equipment, such as a vacuum, is employed to try to remove bubbles from fluid being dispensed into fluidic devices. Thus, there is a need for improved apparatuses and methods that are capable of permitting liquid of a fluid sample into a fluidic device and preventing bubbles of the fluid sample from entering the fluidic device.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The present disclosure includes various examples of an assembly for loading a fluid sample into a fluid cartridge. In accordance with one example, the assembly comprises a docking console including a cartridge support surface having a first end and a second end and a manifold having one or more wells defined therein. The docking console comprises a manifold retention bracket to releasably hold the manifold against a fluid cartridge supported on the cartridge support surface at an interface position such that the one or more wells are in fluid communication with the fluid cartridge and a biased seal bar to press the fluid cartridge against the manifold held by the manifold retention bracket.

In another example, the assembly comprises a docking console including a cartridge support surface having a first end and a second end and a manifold having one or more wells defined therein. Each one of the wells comprises a retainer chamber and an outlet aperture disposed below and in communication with the retainer chamber and a hydrophilic porous frit disposed within at least one of the wells to permit liquid to flow through the outlet aperture but prevent gas from passing through the outlet aperture.

In another example, a method for dispensing fluid into a fluid cartridge comprises placing the fluid cartridge on a cartridge support surface of a docking console such that a positioning device of the docking console engages the fluid cartridge and biases the fluid cartridge or the component thereof into an interface position; placing a manifold having one or more wells defined therein on a manifold retention bracket of the docking console; moving the manifold retention bracket from a release position to a locking position to hold the manifold against the fluid cartridge such that the one or more wells are in fluid communication with the fluid cartridge; dispensing fluid into the one or more wells of the manifold such that the fluid is dispersed into the fluid cartridge; moving the manifold retention bracket from the locking position to the release position; and removing the manifold and the fluid cartridge from the docking console.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

DETAILED DESCRIPTION

Figure 1A:
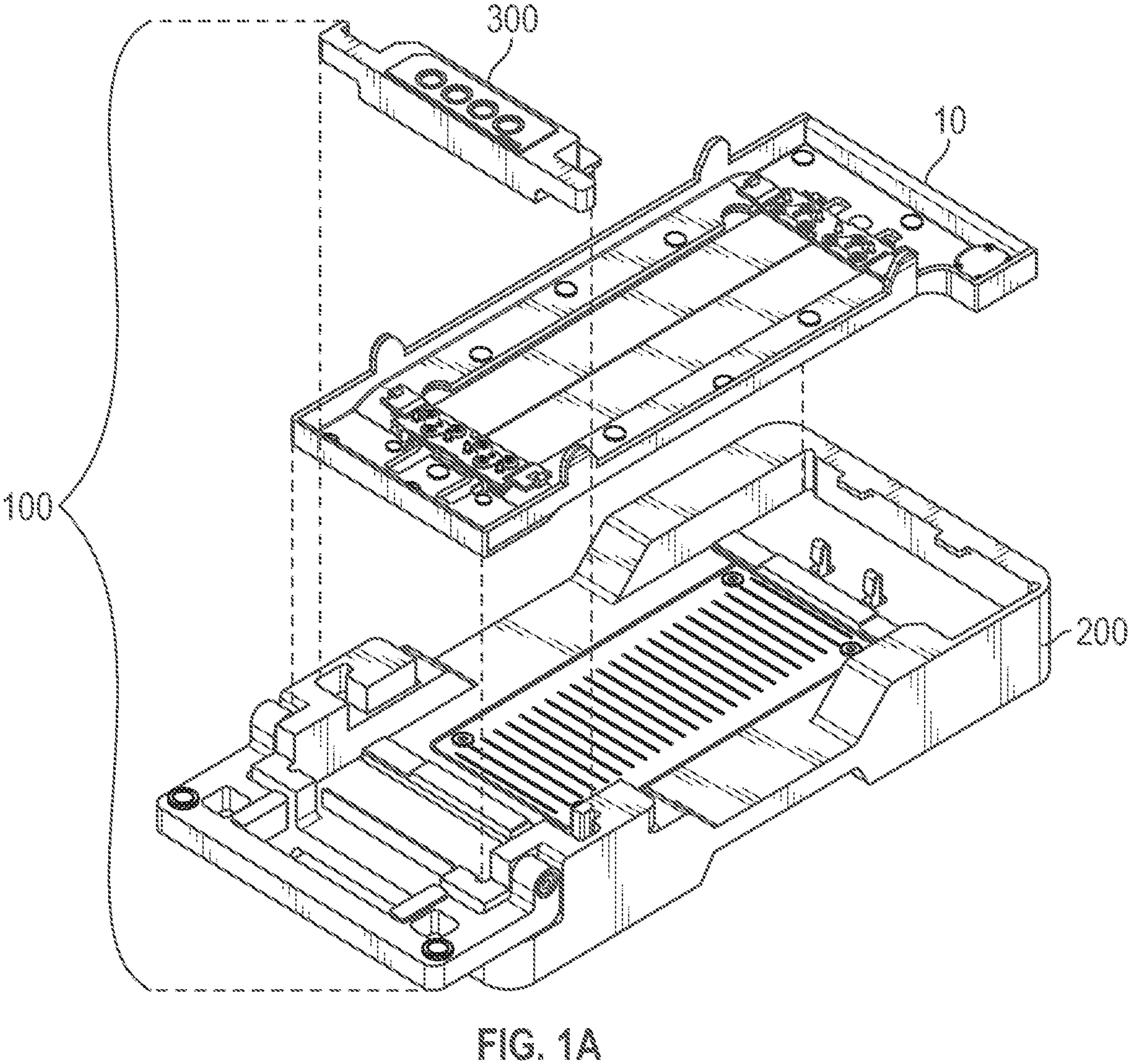
FIG. 1A is an exploded perspective view of an example fluid dispenser assembly and an example fluid cartridge.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

According to various examples, assemblies and devices as described herein may be used in combination with a fluid cartridge that may comprise one or more fluid processing passageways including one or more elements, for example, one or more of a channel, a branch channel, a valve, a flow splitter, a vent, a port, an access area, a via, a bead, a reagent containing bead, a cover layer, a reaction component, any combination thereof, and the like. Any element may be in fluid communication with another element.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a bustable valve, or otherwise opening a valve disposed in the fluid processing passageway.

Figure 1B:
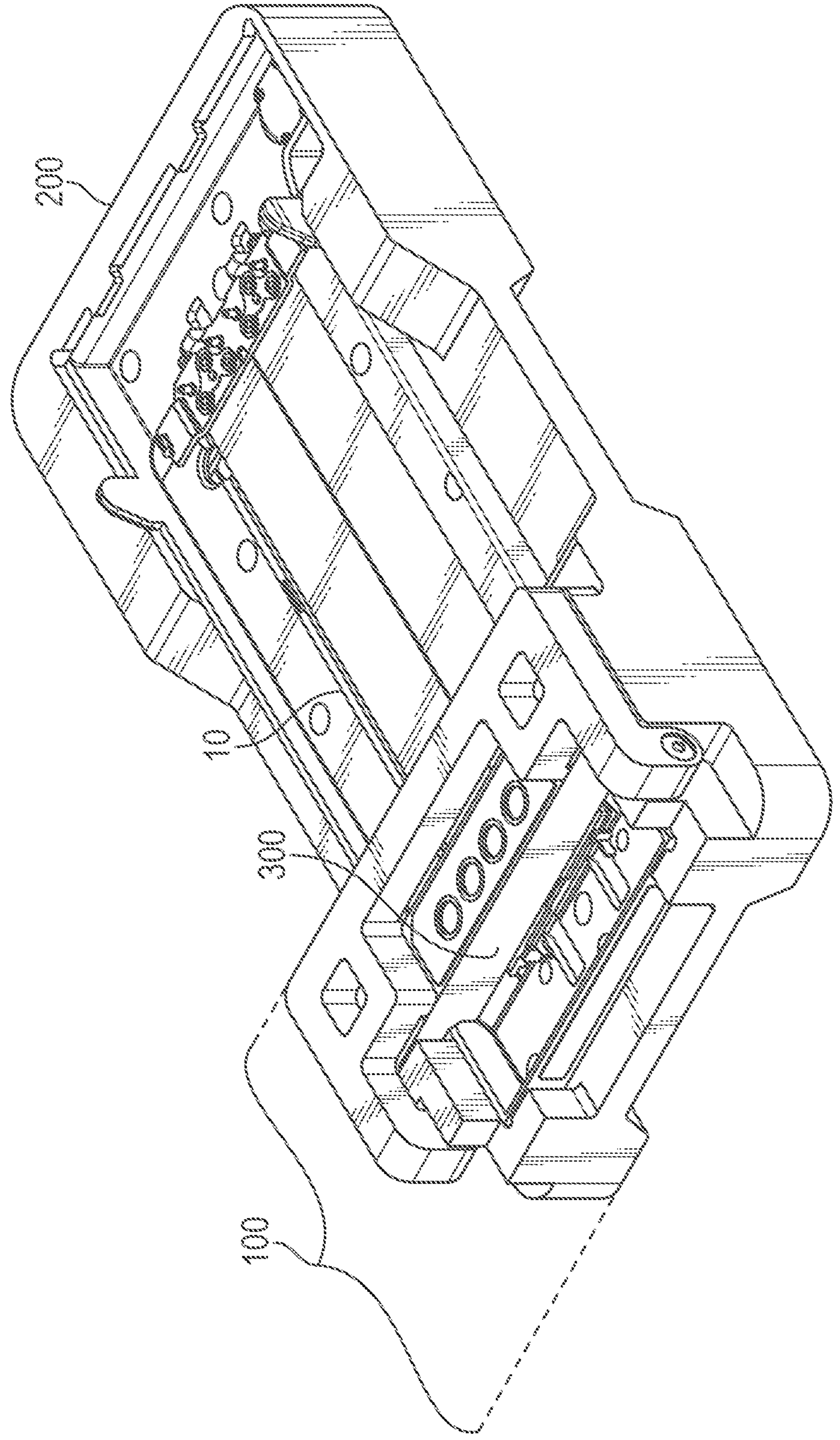
FIG. 1B is a perspective of an example fluid dispenser assembly retaining an example fluid cartridge.

Referring to FIGS. 1A and 1B, an example of the assembly as disclosed herein is indicated by reference number 100 and includes a docking console 200 and a manifold 300. The docking console 200 is configured to releasably hold the manifold 300 against a fluid cartridge 10 supported on the docking console 200 such that a fluid sample may be loaded into the fluid cartridge 10 via the manifold 300. The manifold 300 is configured to be operatively mated to inlet ports of the fluid cartridge 10 and receive a fluid sample from a dispenser (e.g., manually or robotically operated) and transfer the fluid into the fluid cartridge 10 via the inlet ports.

Figure 2:
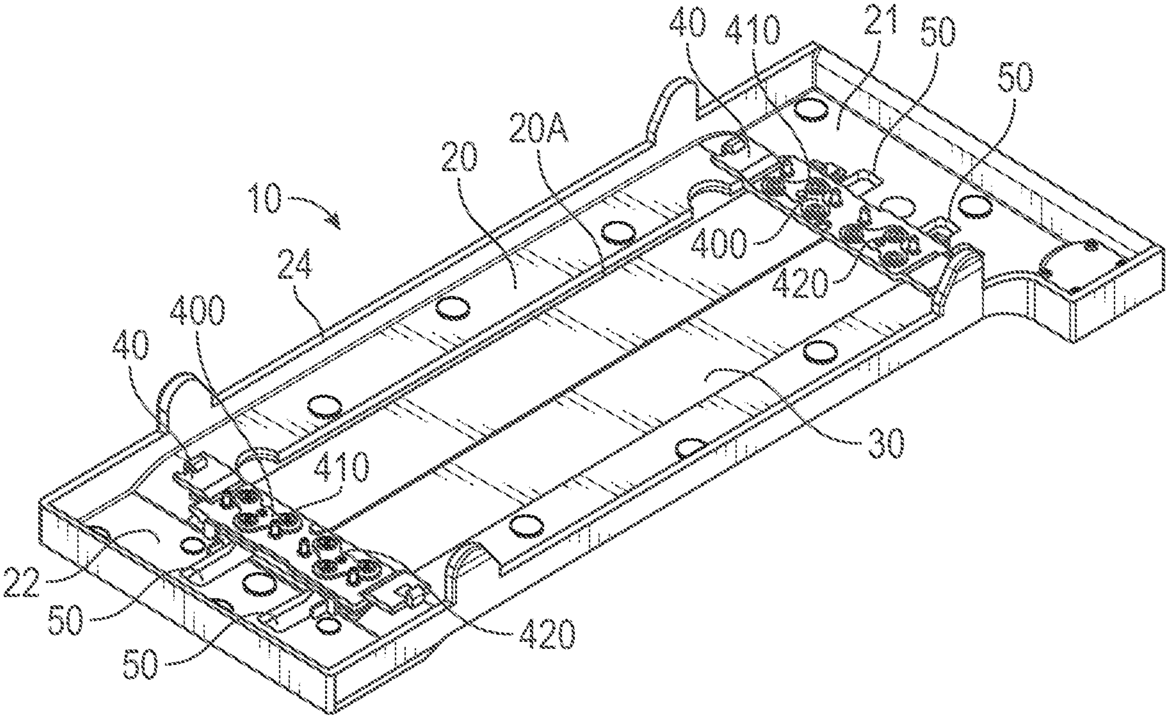
FIG. 2 is a perspective view of an example fluid cartridge.

Referring to FIG. 2 is an example fluid cartridge 10 that may be used with assembly 100. The fluid cartridge 10 includes a flow cell 30 and a frame board 20. The flow cell 30 is disposed in an opening 20A of the frame board 20, in which the frame board 20 circumvents the perimeter of the flow cell 30. The frame board 20 is configured to hold the flow cell 30 within a plane defined by the frame board 20. A frame wall 24 extends along the periphery of the frame board 20. In one example, the flow cell 30 comprises a first glass layer (not shown) and a second glass layer (not shown) secured together and defining one or more channels (not shown) therein. The flow cell 30 includes one or more inlet ports (not shown) and one or more outlet ports (not shown) disposed along its upper surface so that fluid may be accepted into or displaced from the one or more channels. In one example, the opening 20A is sized and shaped such that the flow cell 30 is configured to move within the opening 20A in a lateral direction with respect to the frame board 20. In alternative example, the flow cell 30 may be fixed at one position.

As shown in FIG. 2, the fluid cartridge 10 includes one or more flow cell brackets 40 that extend laterally across the fluid cartridge 10 and secure the flow cell 30 to the frame board 20. Each flow cell bracket 40 retains one or more gasket strips 400 disposed above the upper surface of the flow cell 30. Each gasket strip 400 comprises an elastically compressible material (e.g., elastomer) and defines one or more openings 410, in which each of the openings 410 includes a compressible ring 420 secured within the gasket strip 400. In the present context, a compressible material refers to a material that may be elastically strained, thinned, or deformed by application of a compressive force and returns or substantially returns to its previous size, shape, or configuration upon removal of the compressive force. In a decompressed state, the rings 420 extend above and below the gasket strip 400. In one example, the gasket strip 400 may comprise a material more compressible than the material of the ring 410.

In one example, each flow cell bracket 40 is configured to move along both the frame board 20 and the flow cell 30 in a longitudinal direction with respect to the frame board 20. Accordingly, the position of the gasket strip 400 with respect to the flow cell 30 may be adjusted by shifting the flow cell bracket 40 in the longitudinal direction. The flow cell bracket 40 may be shifted to an interface position along the flow cell 30. When the flow cell bracket 40 is set at the interface position, the gasket strip 400 is oriented such that each one of the openings 410 of the gasket strip 400 is generally aligned with a corresponding inlet or outlet port of the flow cell 30.

Figure 3:
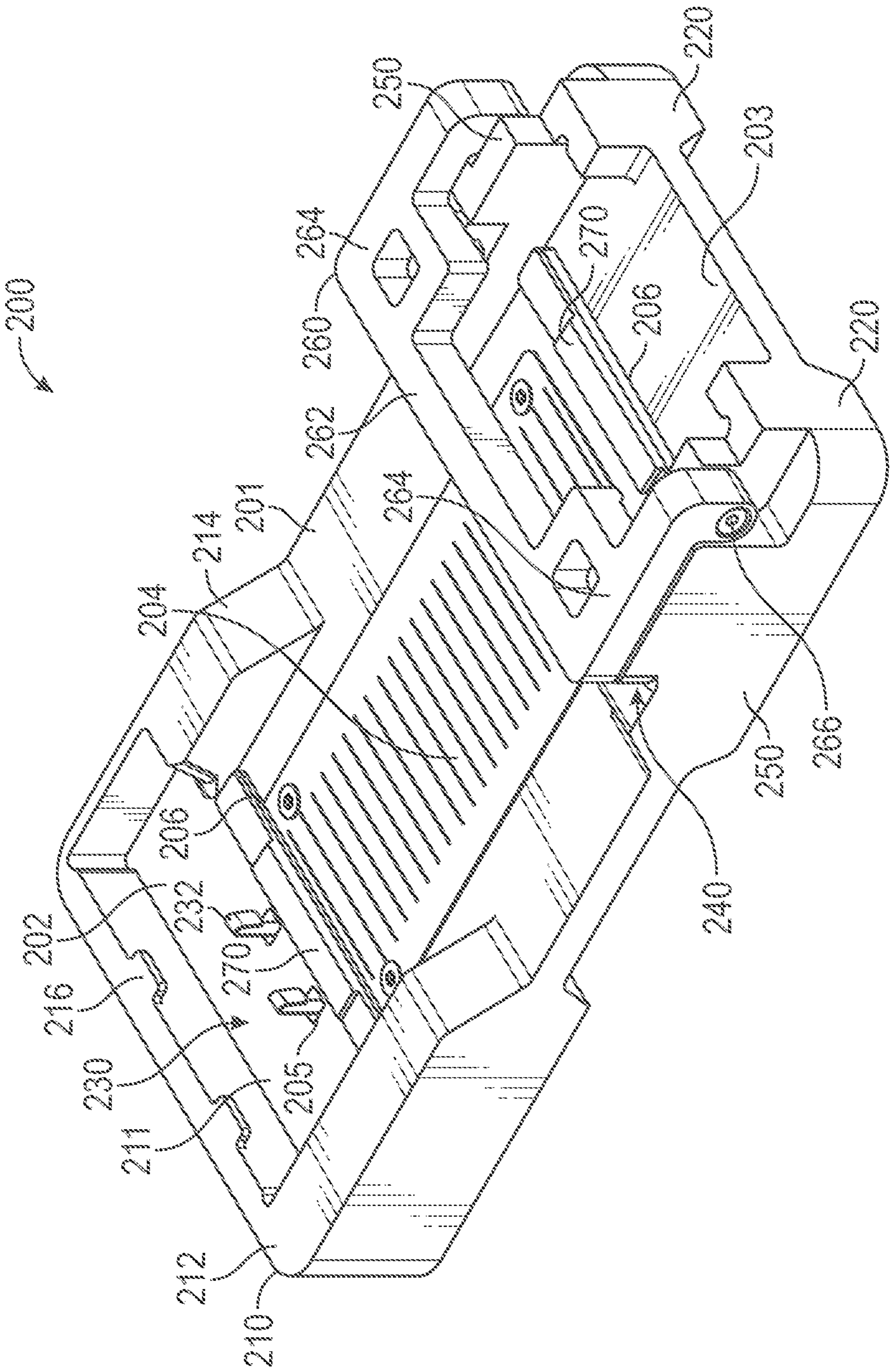
FIG. 3 is a perspective view of an example docking console.

Details of the fluid dispenser assembly 100 are shown in FIGS. 3-7. As shown in FIGS. 3, 4A, and 5A, the docking console 200 includes a cartridge support surface 201 extending from a first end 202 to a second end 203. The cartridge support surface 201 defines a shape and size corresponding to the shape and size of the fluid cartridge 10 such that the entire bottom surface of the fluid cartridge 10 may be supported on the cartridge support surface 201. In an example, a fill gage 204 comprising gradation marks or other indicia is disposed in an opening of the cartridge support surface 201. The cartridge support surface 201 circumvents and holds the fill gage 204 such that an upper surface of the fill gage 204 is flush with the cartridge support surface 201. In an example, the fill gage 204 includes a series of lines to visually indicate the progress and success rate of a fluid sample loaded into the transparent flow cell 30 of the fluid cartridge 10 when held by the docking console 200. The docking console 200 may include access for a scanner barcode or a Radio Frequency-Identification tag disposed along cartridge support surface 201, so that the docking console 200 may be easily located to keep track of a fluid sample.

Figure 4A:
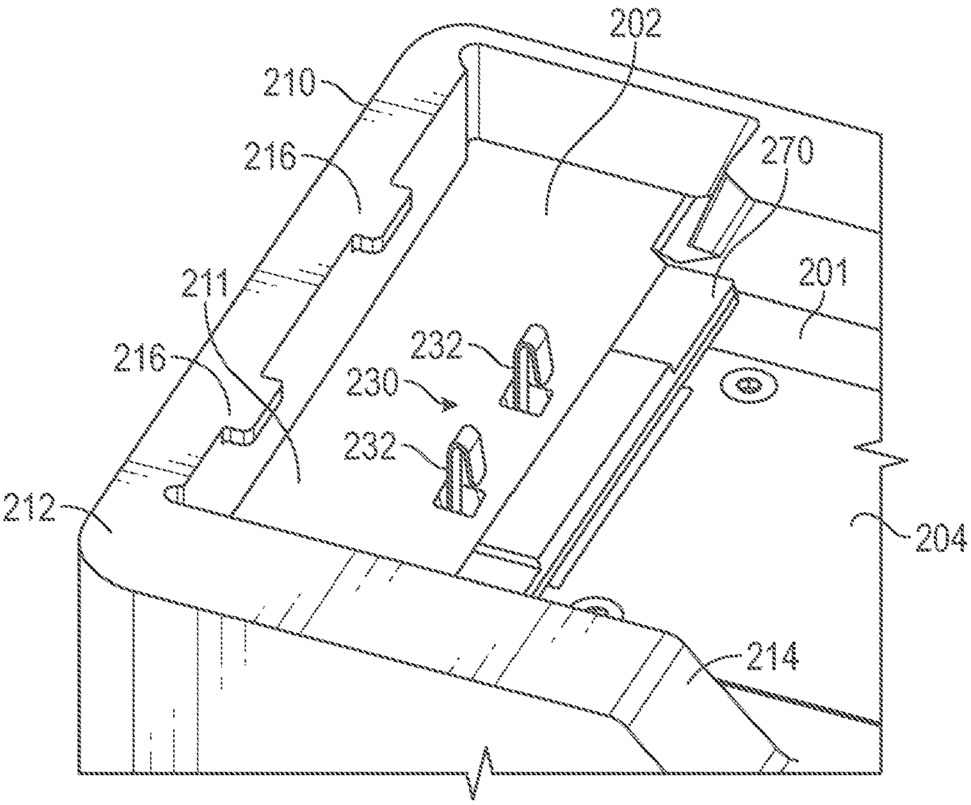
FIG. 4A is a partial view of an example first end of a docking console.
Figure 4B:
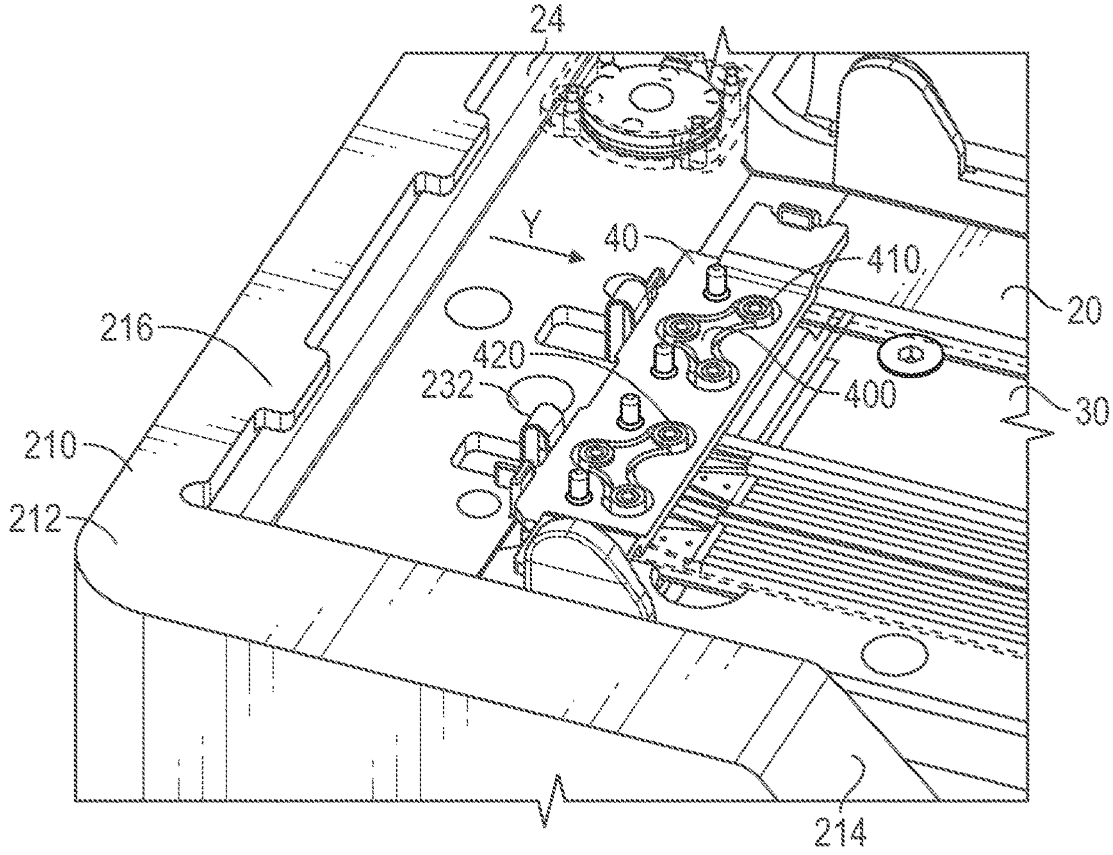
FIG. 4B is a partial view of an example first end of a docking console retaining a fluid cartridge on a cartridge support surface.

Referring to FIGS. 3, 4A, and 4B, a rim wall 210 projects proximately from the first end 202 of the cartridge support surface 201. The rim wall 210 includes an upper surface 212 extending around the first end 202 and partially along the sides of the cartridge support surface 201. The rim wall 201 terminates along the sides of the cartridge support surface 201, where a pair of beveled surfaces 214 slope down from the upper surface 212 to the cartridge support surface 201. The rim wall 210 defines a cavity 211 along the cartridge support surface 201 such that the cavity 211 conforms to the shape of at least a portion of the fluid cartridge 10. Accordingly, as shown in FIG. 4B, when the fluid cartridge 10 is placed on the cartridge support surface 201, the frame wall 24 of the fluid cartridge 10 abuts an interior surface of the rim wall 210. In one example, the shape of the fluid cartridge 10 is asymmetric, in which the width of a first end 21 of the frame board 20 is greater than the width of a second end 22 of the frame board 20. The shape and size of the first end 202 of the cartridge support surface 201 and the rim wall 210 correspond to the shape and size of the first end 21 of the frame board 20, thereby allowing a user to easily identify and align the orientation of the fluid cartridge 10 with respect to the docking console 200.

As shown in FIGS. 3, 4A, and 4B, the rim wall 210 includes one or more tabs 216 that extend from the upper surface 212. When the fluid cartridge 10 is placed on the cartridge support surface 201, each tab 216 engages the frame wall 24 to restrict vertical movement of the fluid cartridge 10. Referring to FIG. 3, a backstop 220 projects proximately the second end 203 of the cartridge support surface 201 such that the frame wall 24 of the fluid cartridge 10 abuts an interior surface of the backstop 220 when placed on the cartridge support surface 201. Accordingly, the combination of the rim wall 210, tabs 216, and the backstop 220 restrict lateral, longitudinal, and vertical movement of the fluid cartridge 10 when received on the cartridge support surface 201.

Referring to FIGS. 3, 4A, and 4B, the docking console 201 includes a positioning device 230 configured to bias the fluid cartridge 10 or a component thereof (e.g., flow cell 30, flow cell bracket 40) into an interface position with respect to a manifold 300 held in the docking console 200. The positioning device 230 includes one or more prongs 232 disposed adjacent to the first end 202 of the cartridge support surface 201, in which the prongs 232 project through slots 205 formed along cartridge support surface 201. The prongs 232 are biased, e.g. by a spring or the prongs 232 may comprise a resilient material (e.g., bent spring steel), toward the second end 203 of the cartridge support surface 201. In this context, a resilient material refers to a material that may absorb energy without permanent deformation when deformed elastically by an applied force and release the absorbed energy upon unloading of the force. As shown in FIG. 4B, when the fluid cartridge 10 is placed on the cartridge support surface, each prong 232 extends through a slot 50 of the fluid cartridge 10 and engages a respective flow cell bracket 40 of the fluid cartridge 10. Because the one or more prongs 232 are biased toward the second end 203 of fluid cartridge support surface 201, the one or more prongs 232 apply a force in direction Y, thereby urging the flow cell bracket 40 into the interface position. Accordingly, once fluid cartridge 10 is received in the cavity 211 and placed on the cartridge support surface 201, the positioning device 230 biases the flow cell bracket 40 to the interface position via the prongs 232 such that the openings 410 of each gasket strip 400 become generally aligned with a respective inlet or outlet port of the flow cell 30.

Figure 5A:
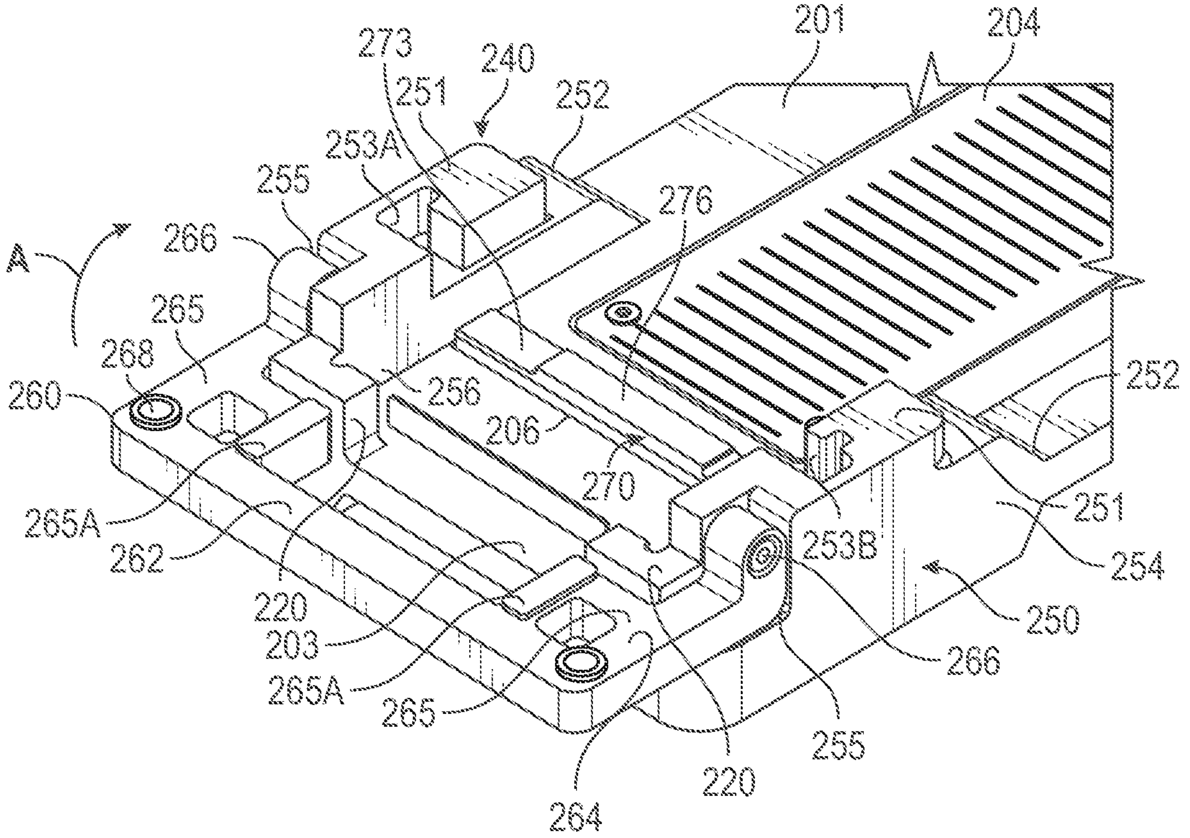
FIG. 5A is a view of a second end of a docking console with a manifold retention bracket in a release position.
Figure 5B:
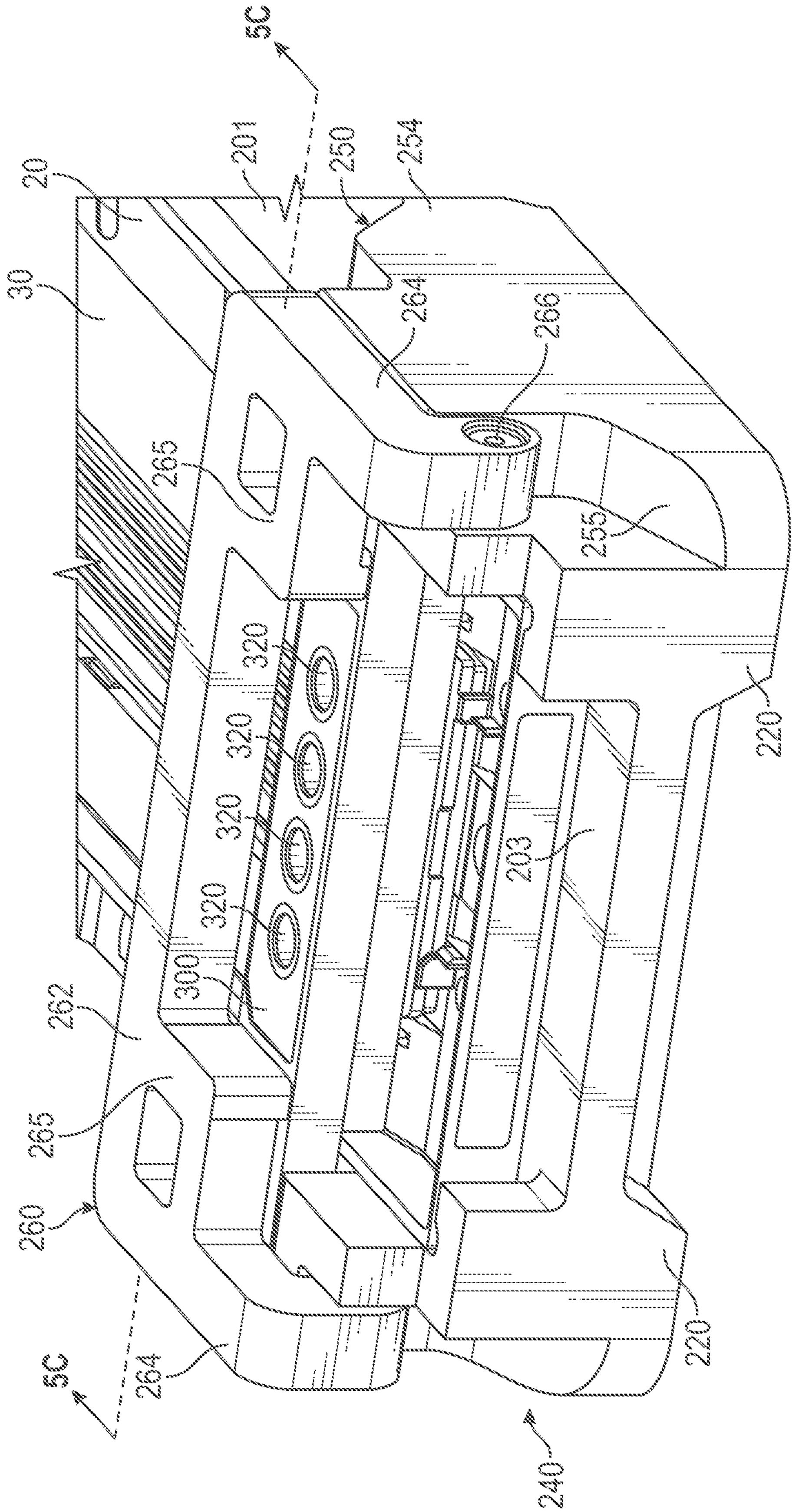
FIG. 5B is a view of an example second end of a docking console with the manifold retention bracket in a locking position to retain the fluid cartridge and a manifold.

Referring to FIGS. 3, 5A, and 5B, the docking console 201 includes a manifold retention bracket 240 configured to releasably hold the manifold 300 within the docking console 200 and against the fluid cartridge 10 supported on the cartridge support surface 201. The manifold retention bracket 240 comprises a pair of sidewalls 250 and a clamp arm 260. The pair of sidewalls 250 extend along opposite sides of the cartridge support surface 201 adjacent to the second end 203 and the clamp arm 260 pivotably secured to the pair of sidewalls 250. As shown in FIG. 5A, each sidewall 250 includes an upper surface 251 that extends from the backstop 220 toward the first end 202 of the cartridge support surface 201 and terminates along the side of cartridge support surface 201, where a step surface 252 slopes downward from the upper surface 251 to the cartridge support surface 201. The step surface 252 of the sidewall 250 is longitudinally spaced from the beveled surface 214 of the rim wall 210 so that a clearance along the sides of the cartridge support surface 201 extends between the pair of sidewalls 250 and the rim wall 210. Accordingly, a user may grasp the sides of the cartridge support surface 201 along the clearance extending between the pair of sidewalls 250 and the rim wall 210. Each sidewall 250 includes a recess 253A, 253B extending along the top surface 251 and configured to hold at least a portion of the manifold 300.

As shown in FIGS. 5A and 5B, the clamp arm 260 is rotatably coupled to the pair of sidewalls 250 such that the clamp arm 260 is configured to pivot in direction A between a release position (shown in FIG. 5A) and a locking position (shown in FIG. 5B). The clamp arm 260 includes a handle bar 262 extending between a pair of legs 264. The handle bar 262 is oriented transverse with respect to the cartridge support surface 201. Each leg 264 extends from the handle bar 262 across a respective sidewall 250. The clamp arm 260 includes a pair of contact elements 265, in which each contact element 265 extends from both the handle bar 262 and a respective leg 264 in a transverse direction. As shown in FIG. 5A, each contact element 265 defines a raised surface 265A configured to provide contact pressure on a top surface of the manifold 300 when the clamp arm 260 is set in the locking position. The contact elements 265 are spatially separated from each other in a direction along the handle bar 262 so that a clearance extends between the pair of contact elements 265. As shown in FIG. 5B, the position of the contact elements 265 along the handle bar 262 allows the handle bar 262 and the raised surface 265A to engage the top surface of the manifold 300 without blocking access to the one or more wells 320 defined in the manifold 300 when the clamp arm 260 is set in the locking position.

In one example, each sidewall 250 includes a niche 255 extending along its exterior surface 254, where a hinge 266 is mounted to receive an end of a respective leg 264 of the clamp arm 260. In one example, the manifold retention bracket 240 includes a locking mechanism to releasably lock the clamp arm 260 against the pair of sidewalls 250 when the clamp arm 260 is set in the locking position. In one example, the locking mechanism includes a magnet 268 disposed at the intersection between the handle bar 262 and the respective leg 264 so that the clamp arm 260 is configured to be magnetically coupled to at least one of the sidewalls 250 when the clamp arm 260 is set in the locking position. The pair of sidewalls 250 may include a magnetic material, such as steel, to promote magnetic attraction to magnet 268. In other examples, the magnet 268 may be disposed at other locations along the clamp arm 260, and a second magnet (not shown) may be disposed along the sidewalls 250 such that the second magnet couples to magnet 268 when the clamp arm 260 is set in the locking position. The magnet(s) could be disposed in one or both sidewalls 250 and a magnetic material may be provided in an overlapping portion of the clamp arm 260. In alternative examples, the clamp arm 260 can be releasably secured in a locking position by other locking mechanisms, such as, a detent(s), clasp(s), etc.

Referring to FIGS. 3, 4A, 5A, 5C, and 5D, the docking console 201 includes one or more seal bars 270 configured to press the fluid cartridge 10 upwardly against the manifold 300 when held by the manifold retention bracket 240. Each seal bar 270 is received in a transverse recess 206 extending into the cartridge support surface 201. The seal bar 270 includes a first end 271 abutting an interior surface 256 of one of the sidewalls 250 and a second end 272 abutting an interior surface 256 of the other one of the sidewalls 250. The seal bar 270 includes a first surface 273 extending from the first end 271 to the second end 272. The seal bar 270 includes an engagement surface 276 projecting from the first surface 273. In one example, the width of the engagement surface 276 corresponds to the width of the flow cell 30 of the fluid cartridge 10 so that the engagement surface 276 is configured to press the entire width of the flow cell 30 when the fluid cartridge 10 is placed on the cartridge support surface 201.

Figure 5C:
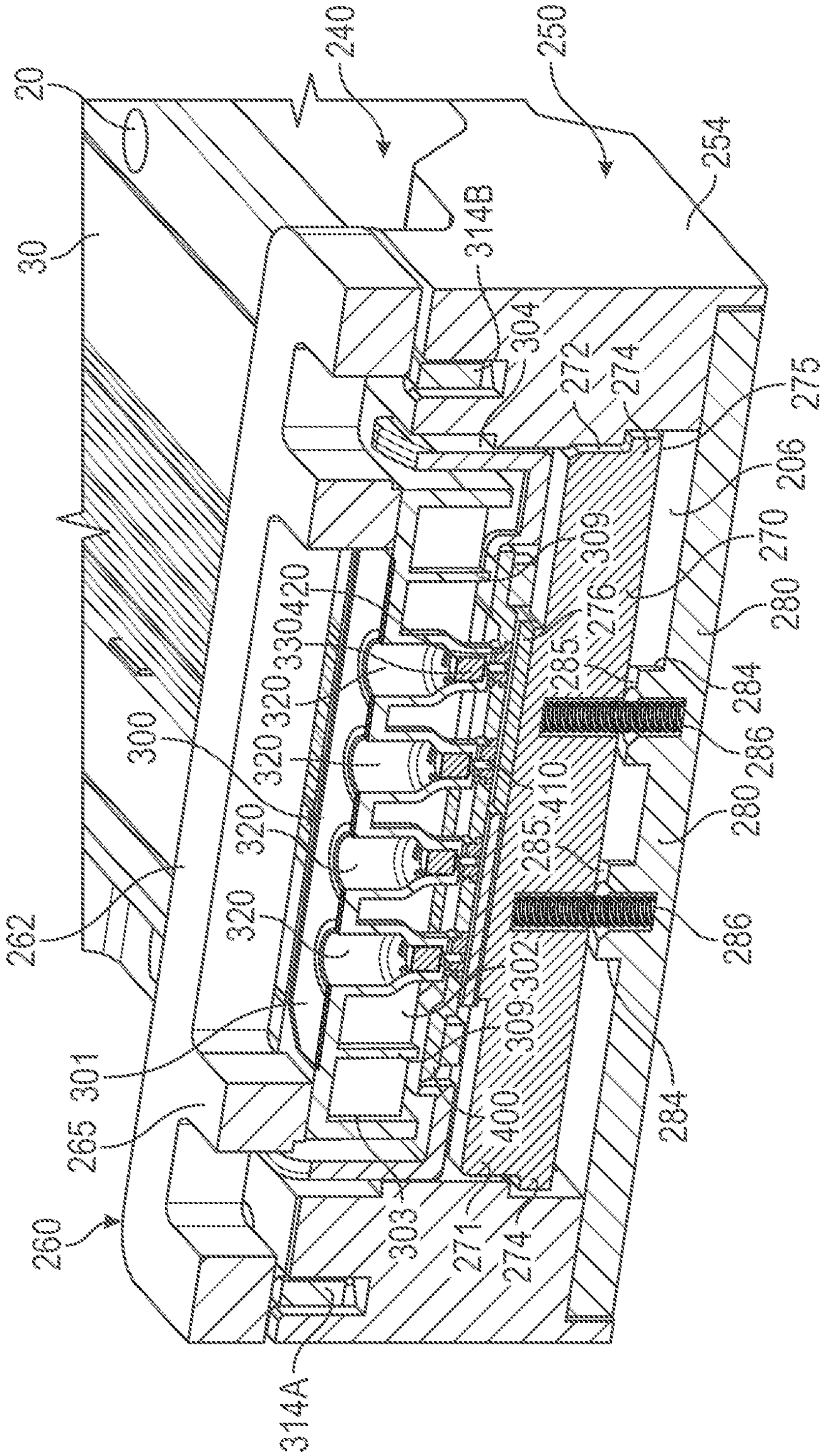
FIG. 5C is an end cross-sectional view of an example fluid dispenser assembly retaining a fluid cartridge along line V-V in FIG. 5B.
Figure 5E:
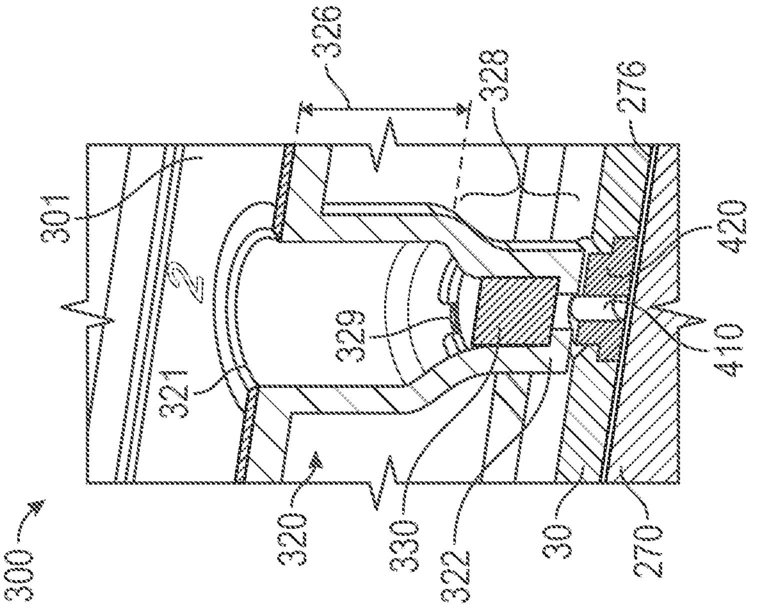
FIG. 5E is a partial cross-sectional view of an example well of a manifold along line V-V of FIG. 5B.
Figure 5D:
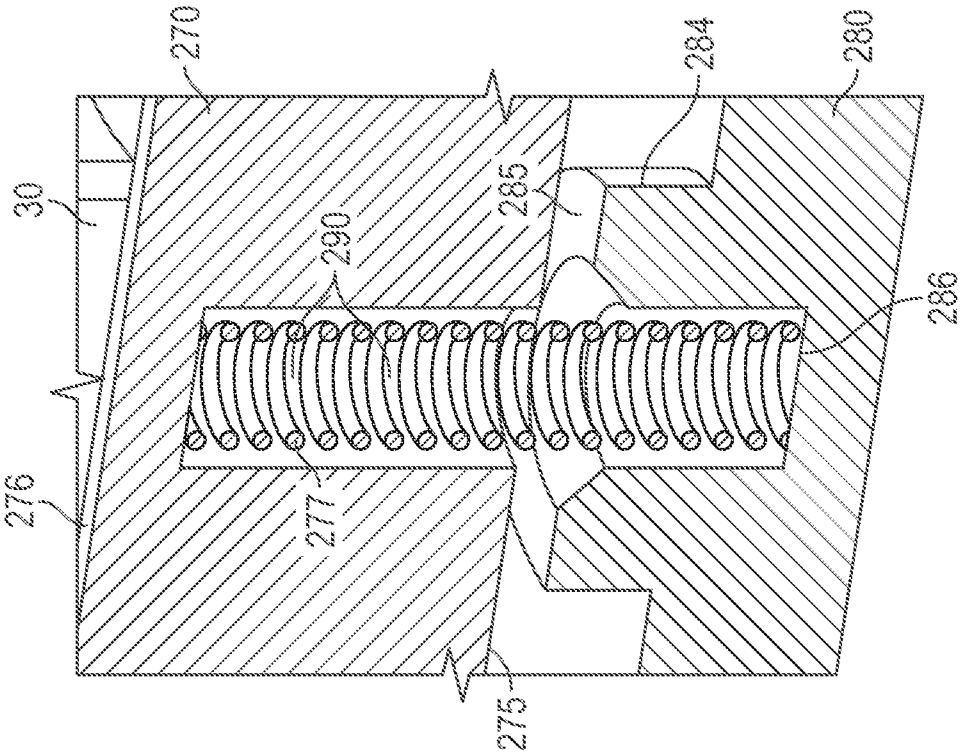
FIG. 5D is a partial cross-sectional view of an example biased seal bar along link V-V in FIG. 5B.

As shown in FIGS. 5C and 5D, the seal bar 270 is biased, e.g. by a spring, to an extended position such that the first surface 273 of the seal bar 270 projects above the cartridge support surface 201. The seal bar 270 includes one or more shoulders 274 projecting from the first end 271 and the second end 272. Each shoulder 274 is disposed in sliding engagement with the interior surface 256 of a respective sidewall 250 and configured to move in the vertical direction along the interior surface 256 of the sidewall 250. Each sidewall 250 includes a protuberance 257 projecting from the interior surface 256 and into the recess 206 such that the protuberance 257 limits the vertical movement of the shoulder 274. A base board 280 is disposed along the bottom of the recess 206, where each end of the base board 280 is received in a slot extending into the interior surface 256 of the sidewall 250.

Referring to FIGS. 5C and 5D, in one example, the seal bar 270 is biased by one or more compression springs 290 disposed between a bottom surface 275 of the seal bar 270 and the base board 280. As shown in FIG. 5D, the bottom surface 275 of the seal bar 270 includes a recess 277 configured to receive an upper end of a corresponding compression spring 290. The base board 280 includes one or more spring housings 284 projecting from a first surface 282 towards the bottom surface 275 of the seal bar 270. Each spring housing 284 defines a cylindrical-shaped cavity extending from a resting surface 286 to an upper surface 285. Each spring housing 284 of the base board 280 is generally aligned with a corresponding recess 277 of the seal bar 270. The spring housing 284 is configured to receive the compression spring 290, in which a bottom end of the compression spring 290 rests against the resting surface 286.

When the fluid cartridge 10 is initially placed on the fluid cartridge support surface 201, the contact between the flow cell 30 and the engagement surface 276 applies a force toward the base board 280, which urges the compression spring 290 against the resting surface 286. In return, the potential energy of the compression spring 290 is released applying a restoring force against the seal bar 270 in a direction towards the fluid cartridge 10. Accordingly, the engagement surface 276 of the seal bar 270 presses the flow cell 30 of the fluid cartridge 10 in a direction towards the manifold 300 when held by the manifold retention bracket 240.

Figure 6A:
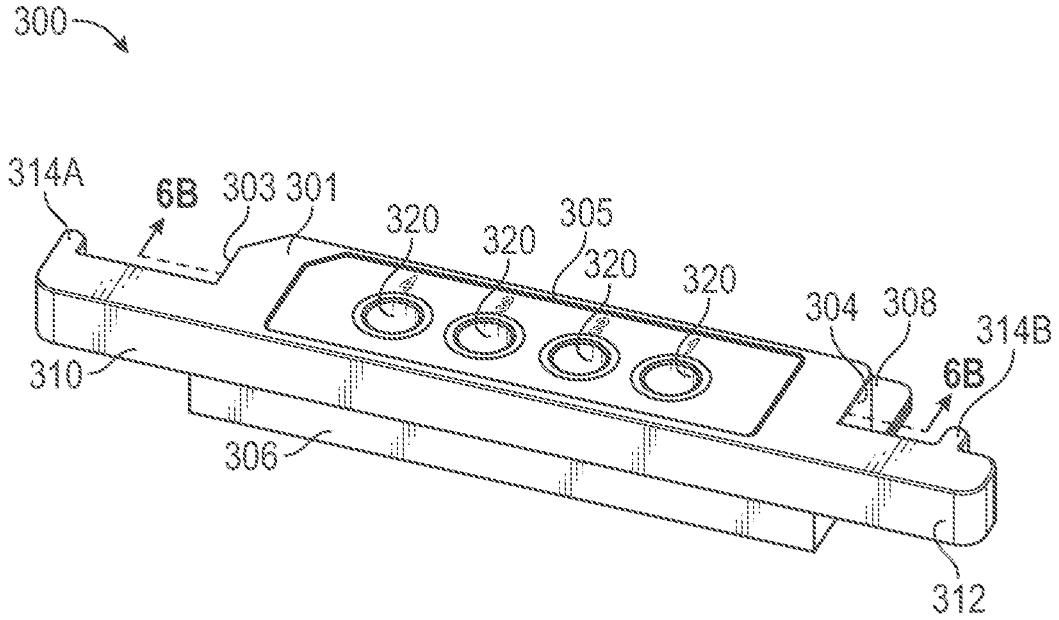
FIG. 6A is a perspective view of an example manifold.
Figure 6B:
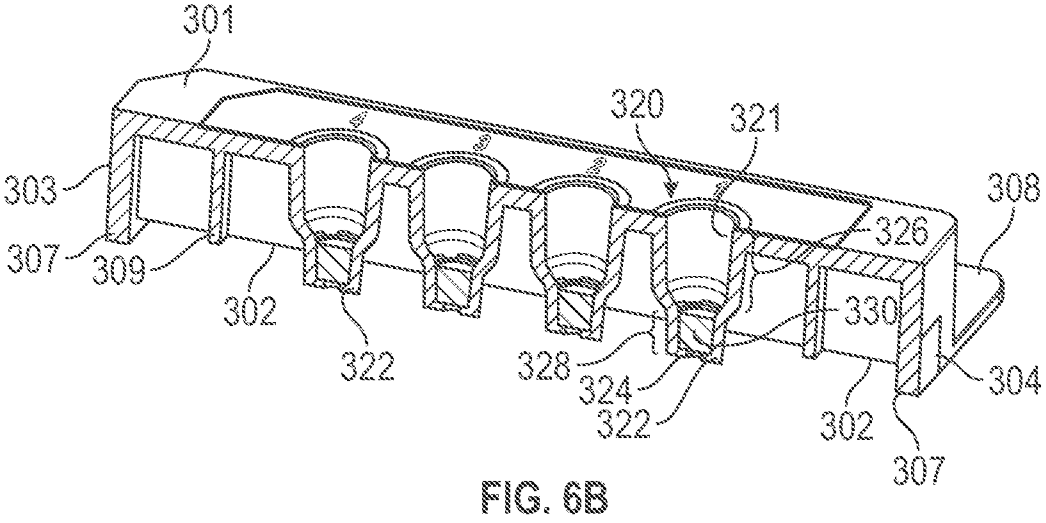
FIG. 6B is a side cross-sectional view of an example manifold along line VI-VI of FIG. 6A.
Figure 6C:
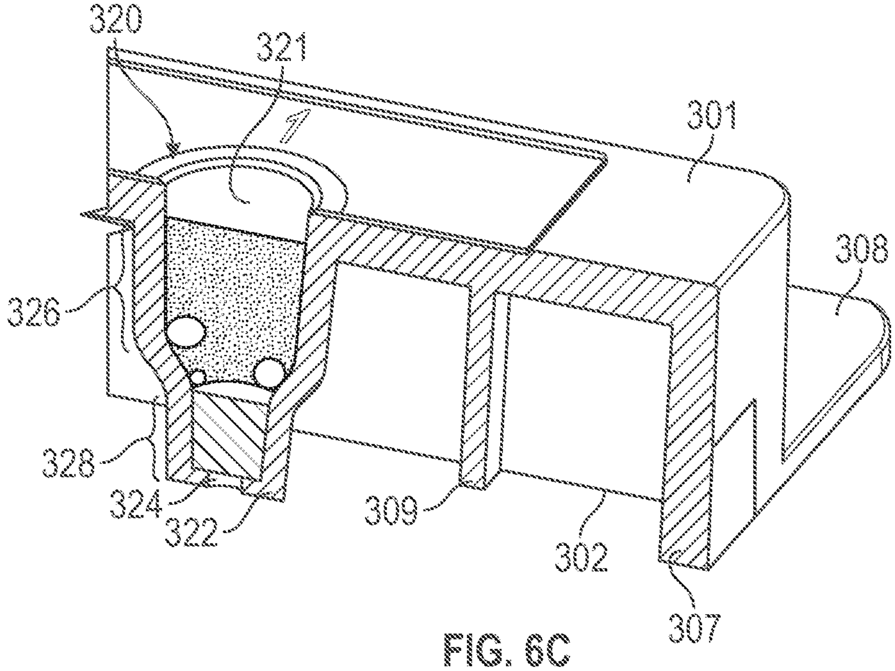
FIG. 6C is a partial cross-sectional view of an example well along line of FIG. 6A

Referring to FIGS. 6A, 6B, and 6C, the manifold 300 may comprise a molded body (e.g., polypropylene) having a first surface 301 and an opposed second surface 302, in which the first surface 301 and the second surface 302 extend longitudinally between a first end 303 and a second end 304 and laterally between a front side 305 and a back side 306. As shown FIG. 6B, the second surface 302 is retracted from a bottom edge 307 of each of the first and second ends 303, 304 and a bottom edge 307 of the front and back sides 305, 306 such that the bottom edge 307 of each of the first and second ends 303, 304 and the front and back sides 305, 306 extends below the second surface 302. A flange 308 projects from the bottom edge 307 of the front side 305 of the manifold 300. The flange 308 may engage the upper surface of the flow cell 30 when the manifold 300 is secured against the fluid cartridge 10, thereby assisting a user to install and remove the manifold 300 from the docking console 200 while preventing the user from touching the flow cell 30.

Referring to FIG. 6B, in one example, the manifold 300 includes one or more ribs 309 projecting from the second surface 302. As shown in FIG. 5C, the one or more ribs 309 are disposed along surface 302 such that each rib 309 overlies a portion of the frame board 20 when the manifold 300 is secured against the fluid cartridge 10 and held by the docking console 200. Accordingly, once the manifold 300 is secured against the fluid cartridge 10 and held by the docking console 200, the one or more ribs 309 are configured to press the gasket strip 400 against the frame board 20.

As shown in FIG. 6A, in one example, the manifold 300 includes a first arm 310 projecting from the first end 303 and a second arm 312 projecting from the second end 304, in which the first surface 301 extends along both the first arm 310 and the second arm 312. Referring to FIG. 5A, the first and second arms 310, 312 are configured to be received in recesses 253A, 253B defined in the pair of the sidewalls 250. As shown in FIG. 6A, a first tab 314A projects from an end of the first arm 310. A second tab 314B projects from a side of the second arm 312 and is spaced from an end of the second arm 312 so that the shape of the first arm 310 is asymmetric to the shape of the second arm 312. Correspondingly, the recess 253A of one of the sidewalls 250 is configured to receive only one of the first arm 310 or second arm 312, and the recess 253B of the other one of the sidewalls 250 is configured to receive only the other one of the first arm 310 or second arm 312. Accordingly, in one example, the manifold 300 is configured to be held by the manifold retention bracket 240 at only one orientation, thereby ensuring that the manifold 300 is properly placed along the fluid cartridge 10.

As shown in FIGS. 5C, 5E, 6A, 6B, and 6C, the manifold 300 includes one or more wells 320 defined therein, in which each one of the wells 320 is configured to receive a fluid sample dispensed from a dispenser. The manifold 300 may further include a label disposed on the first surface 301 to provide lane number identifiers for each well 320.

Referring to FIGS. 5C, 5E, 6B, and 6C, each well 320 extends from an inlet opening 321 defined in the first surface 301 to a bottom surface 322 that projects below the second surface 302. An outlet aperture 324 is defined in the bottom surface 322 of each one of the wells 320 and configured to communicate with a corresponding inlet port of the flow cell 30 when the manifold 300 is secured against the fluid cartridge 10 on the docking console 200. As shown in FIGS. 5E, 6B, and 6C, each well 320 defines an accumulator section 326 extending from the inlet opening 321 and a retainer chamber 328 extending from the bottom surface 322, in which the retainer chamber is 328 disposed below the accumulator section 326 and above the outlet aperture 324. As shown in FIG. 5E, the accumulator section 326 is separated from the retainer chamber 328 by one or more lips 329 projecting from a side of the well 320. As shown in FIGS. 6B and 6C, the diameter throughout the accumulator section 326 is greater than the diameter throughout the retainer chamber 328 so that fluid may be collected in the accumulator section 326 and the flow of fluid controlled through the retainer chamber 328.

As shown in FIGS. 5C, 5E, 6B, and 6C, a hydrophilic porous frit 330 is received in the retainer chamber 328, and the one or more lips 329 secure the hydrophilic porous frit 330 against the bottom surface 322 of the well 320. The hydrophilic porous frit 330 may comprise a porous molded polyethylene (e.g., Porex® XM 1334 Hydrophilic Frit from Filtration Group Corporation, Chicago, IL), in which the pores of the hydrophilic porous frit 330 have a pore size in the range about 15 μm to about 160 μm. The hydrophilic porous frit 330 is coated with a surfactant so that the static water contact angle along the surface of the porous molded polyethylene is less than 90°. Due to the material selection and pore size, the hydrophilic porous frit 330 is configured to permit liquid to flow through the outlet aperture 324 but prevent gas (bubbles) from passing through the outlet aperture 324. When a fluid sample is dispensed into the inlet opening 321 of the well 320, the fluid sample collects in the accumulator section 326 and flows through the retainer chamber 328. As the fluid sample flows through the retainer chamber 328, the hydrophilic porous frit 330 prevents bubbles from passing through the retainer chamber 328, such that bubbles are isolated from the fluid sample before exiting through the outlet aperture 324 of the well 320.

Referring to FIGS. 5C and 5E, when the manifold 300 is held against the fluid cartridge 10 supported on the cartridge support surface 201 at the interface position, the gasket strip 400 is interposed between the bottom surface 322 of each one of the wells 320 and an upper surface of the flow cell 30. As shown in FIG. 5C, each one of the openings 410 of the gasket strip 400 is generally aligned with one the of the outlet apertures 324 of the wells 320. As the clamp arm 260 is set to the locking position and magnetically coupled to the sidewalls 250, the clamp arm 260 applies a force against the manifold 300 in a direction towards the fluid cartridge 10. In response, the compression springs 290 bias the seal bar 270 to the extended position such that the engagement surface 276 urges the flow cell 30 of the fluid cartridge 10 in a direction towards manifold 300. As shown in FIG. 5C, one of the seal bars 270 is at least substantially aligned with the manifold 300 when held against the fluid cartridge 10 at the interface position. Consequently, the gasket strip 400 is compressed between the upper surface of the flow cell 30 and the second surface 302, the one or more ribs 309, and the bottom surface 322 of each one of the wells 320. In addition, the rings 420 in each one of the openings 410 are compressed between the bottom surface 322 of each one of the wells 320 and the upper surface of the flow cell 30. Accordingly, once compressed by the force applied by the clamp arm 260 and the biased seal bar 270, the rings 420 form a fluid sealed connection between each outlet aperture 324 and inlet port of the flow cell 30.

Figure 7:
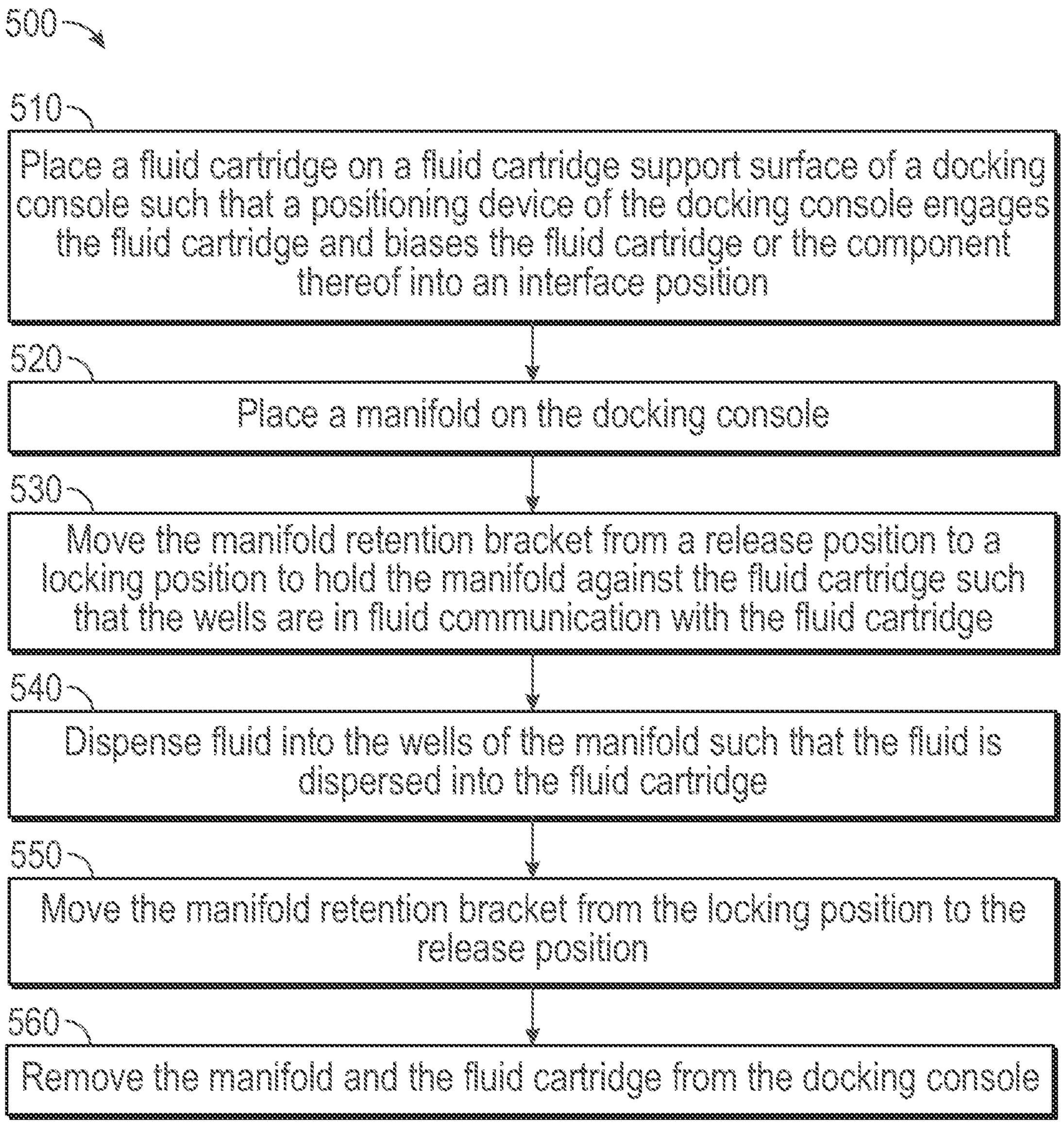
FIG. 7 is a flow chart of an example method for loading flow sample into a fluid cartridge.

FIG. 7 illustrates a method 500 for dispensing fluid into a fluid cartridge using an assembly 100 according to an example. As shown in FIG. 7, the method 500 includes a process 510 of placing the fluid cartridge 10 on the cartridge support surface 201 of the docking console 200 so that the frame wall 24 of the fluid cartridge 10 abuts the rim wall 210 and the backstop 220, thereby limiting lateral, longitudinal, and vertical movement of the fluid cartridge 10 with respect to the cartridge support surface 201. As the fluid cartridge 10 is placed on the cartridge support surface 201, the one or more prongs 232 of the positioning device 230 extend through the slots 50 of the frame board 20 and engage the flow cell bracket 40. Referring to FIG. 4B, the one or more prongs 232 apply a force in direction Y against the flow cell bracket 40, thereby causing the flow cell bracket 40 to slide to the interface position. Accordingly, the openings 410 of each gasket strip 400 become generally aligned with a respective inlet or outlet port of the flow cell 30.

After placing the fluid cartridge 10 on the support surface 201 of the docking console 200, the next process 520 of the method 500 includes placing the manifold 300 on the docking console 200 by inserting the first arm 310 into recess 253A of one of the sidewalls 250 and the second arm 312 into recess 253B of the other one of the sidewalls 250. During both the processes of placing the fluid cartridge 10 on the cartridge support surface 201 and the manifold 300 on the manifold retention bracket 240, the clamp arm 260 is set at the release position.

Once the arms 310, 312 of the manifold 300 are received in the recesses 253 of the sidewalls 250, the next process 530 of the method includes moving the clamp arm 260 of the manifold retention bracket 240 from the release position to the locking position, thereby holding the manifold 300 against the fluid cartridge 10 such that the one or more wells 320 are in fluid communication with the ports and channels of the flow cell 30. When clamp arm 260 is set to the locking position and holds the manifold 300 against the fluid cartridge 10, the rings 420 of the gasket strip 400 are compressed between the bottom surface 322 of each one of the wells 320 and the upper surface of the flow cell 30 to form a fluid sealed connection between the outlet aperture 324 of each one of the wells 320 and the inlet ports of the flow cell 30, as shown in FIG. 5C.

After moving the clamp arm 260 to the locking position to form a fluid a seal connection between the manifold 300 and the flow cell 30, the next process 540 of the method includes dispensing a fluid sample into the one or more wells 320 of the manifold 300 such that the fluid sample is dispersed into the inlet ports and through the channels (e.g., by capillary action) of the flow cell 30. While the fluid sample is dispensed into the one or more wells 320 of the manifold 300, the hydrophilic porous frit 330 in each one of the wells 320 only permits liquid from the fluid sample to pass through the outlet aperture 324 and mitigates, and in some instances even prevents, bubbles from flowing through the outlet aperture 324. By only allowing liquid to pass through the outlet aperture 324 of each one of the wells 320, the hydrophilic porous frit 330 ensures that fluid may flow across the length of the channels in the flow cell 30 by only capillary attraction. The fill gage 204 may indicate visually the progress of the fluid sample flowing through the channels of the flow cell 30.

Once the fluid sample is completely, or at least substantially completely, dispersed into the flow cell 30 of the fluid cartridge 10, the next process 550 of the method includes moving the clamp arm 260 from the locking position to the release position. As shown in FIG. 7, the method further includes the process 560 of removing the manifold 300 and the fluid cartridge 10 from the docking console 200.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A fluid dispenser assembly comprising:

a docking console including a cartridge support surface having a first end and a second end; and a manifold coupled to and extending across a portion of the cartridge support surface of the docking console and one or more wells defined in the manifold, wherein each one of the one or more wells comprises a retainer chamber and an outlet aperture disposed below the retainer chamber, wherein the docking console comprises:

a manifold retention bracket comprising a pair of sidewalls disposed on opposite sides of the cartridge support surface and the pair of sidewalls are configured to hold the manifold in a position extending across the cartridge support surface; and a seal bar disposed in a recess formed in the cartridge support surface below the manifold; and a hydrophilic porous frit disposed within at least one of the one or more wells and constructed and arranged to permit liquid to flow through the outlet aperture but prevent gas from passing through the outlet aperture.

2. The fluid dispenser assembly of claim 1, wherein the hydrophilic porous frit comprises molded polyethylene coated with a surfactant.

3. The fluid dispenser assembly of claim 1, wherein pores of the hydrophilic porous frit comprises a pore size in the range of about 15 μm to about 160 μm.

4. The fluid dispenser assembly of claim 1, wherein the docking console comprises one or more compression springs disposed in the recess between a bottom of the recess and a bottom surface of the seal bar.

5. The fluid dispenser assembly of claim 1, wherein the docking console comprises a positioning device to bias a fluid cartridge supported on the cartridge support surface or a component of the fluid cartridge into a predetermined position with respect to the cartridge support surface.

6. The fluid dispenser assembly of claim 5, wherein the positioning device comprises one or more resilient prongs projecting from the cartridge support surface and disposed at the first end of the cartridge support surface.

* * * * *